United States Patent
Bergström et al.

(10) Patent No.: US 10,667,160 B2
(45) Date of Patent: May 26, 2020

(54) WIRELESS COMMUNICATIONS DEVICE, A NETWORK NODE AND METHODS THEREIN FOR MEASUREMENT REPORTING

(71) Applicant: Telefonaktiebolaget LM Ericsson (publ), Stockholm (SE)

(72) Inventors: Mattias Bergström, Stockholm (SE); Torsten Dudda, Aachen (DE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 385 days.

(21) Appl. No.: 15/301,639

(22) PCT Filed: Aug. 5, 2016

(86) PCT No.: PCT/SE2016/050739
§ 371 (c)(1),
(2) Date: Oct. 3, 2016

(87) PCT Pub. No.: WO2017/030482
PCT Pub. Date: Feb. 23, 2017

(65) Prior Publication Data
US 2017/0188253 A1  Jun. 29, 2017

Related U.S. Application Data

(60) Provisional application No. 62/205,039, filed on Aug. 14, 2015.

(51) Int. Cl.
*H04W 24/10* (2009.01)
*H04W 36/00* (2009.01)
(Continued)

(52) U.S. Cl.
CPC .......... *H04W 24/10* (2013.01); *H04W 24/08* (2013.01); *H04W 36/0069* (2018.08);
(Continued)

(58) Field of Classification Search
None
See application file for complete search history.

(56) References Cited

U.S. PATENT DOCUMENTS

2014/0200001 A1* 7/2014 Song ................ H04W 36/0094
455/436
2014/0247743 A1* 9/2014 Seo ...................... H04W 24/10
370/252
(Continued)

FOREIGN PATENT DOCUMENTS

WO  2015/069173 A1  5/2015
WO  2017007414 A1  1/2017

OTHER PUBLICATIONS

International Search Report and Written Opinion issued in related International application No. PCT/SE2016/050739, dated Oct. 21, 2016, 15 pages.
(Continued)

*Primary Examiner* — Gregory B Sefcheck
*Assistant Examiner* — Srinivasa R Reddivalam
(74) *Attorney, Agent, or Firm* — Rothwell, Figg, Ernst & Manbeck, P.C.

(57) ABSTRACT

A method performed by a wireless communications device for measurement reporting associated with a first wireless communications network to a network node operating in a second wireless communications network. The first and second wireless communications networks operate according to different RATs.
The wireless communications device receives an indication of one or more radio access network nodes operating in the
(Continued)

first wireless communications network, among which one or more radio access network nodes a mobility of the wireless communications device is restricted.

The wireless communications device further determines which radio access network nodes operating in the first wireless communications network are to be used for measurement reporting to the network node, based on the indication of the one or more radio access network nodes among which the mobility of the wireless communications device is restricted in the first wireless communications network.

2 Claims, 11 Drawing Sheets

(51) Int. Cl.
  *H04W 24/08* (2009.01)
  *H04W 36/30* (2009.01)
  *H04W 84/12* (2009.01)
  *H04W 88/02* (2009.01)
  *H04W 88/08* (2009.01)
(52) U.S. Cl.
  CPC ..... *H04W 36/00835* (2018.08); *H04W 36/30* (2013.01); *H04W 84/12* (2013.01); *H04W 88/02* (2013.01); *H04W 88/08* (2013.01)

(56) References Cited

U.S. PATENT DOCUMENTS

| 2015/0271859 A1* | 9/2015 | Huang | H04W 72/12 370/329 |
| 2016/0029295 A1* | 1/2016 | Nagasaka | H04W 48/18 370/237 |
| 2017/0013519 A1* | 1/2017 | Hahn | H04W 36/0077 |
| 2018/0220319 A1* | 8/2018 | Kim | H04W 24/10 |

OTHER PUBLICATIONS

MediaTek Inc., "WLAN measurement reporting," 3GPP TSG-RAN2 #90 Meeting, R2-152133, May 25-29, 2015, 6 pages.

Nokia Networks, "RRM measurements for LTE-WLAN radio aggregation and interworking," 3GPP TSG-RAN WG2 Meeting #90, R2-152108, May 25-29, 2015, 4 pages.

Nokia Networks, "Control plane protocol architecture for LTE-WLAN integration," 3GPP TSG-RAN WG2 Meeting #90, R2-152103, May 25-29, 2015, 4 pages.

Intel Corporation, "Revised WID: LTE-WLAN Radio Level Integration and Interworking Enhancement", 3GPP TSG RAN Meeting #68, Malmö, Sweden, Jun. 15-18, 2015, RP-151114 (10 pages).

Intel Corporation, "New WI Proposal: LTE-WLAN Radio Level Integration and Interworking Enhancement", 3GPP TSG RAN Meeting #67, Shanghai, China, Mar. 9-12, 2015, RP-150510 (9 pages).

Notice of Preliminary Rejection dated Jan. 9, 2019 issued in Korean Patent Application No. 2018-7005446 (9 pages).

3GPP TSG-RAN WG2 Meeting #90, R2-152103, Fukuoka, Japan (May 25-29, 2015); Nokia Networks, "Control plane protocol architecture for LTE-WLAN integration". (4 pages).

3GPP TSG-RAN2 #90 Meeting, R2-152133, Fukuoka, Japan (May 25-29, 2015); MediaTek Inc., "WLAN measurement reporting". (6 pages).

* cited by examiner

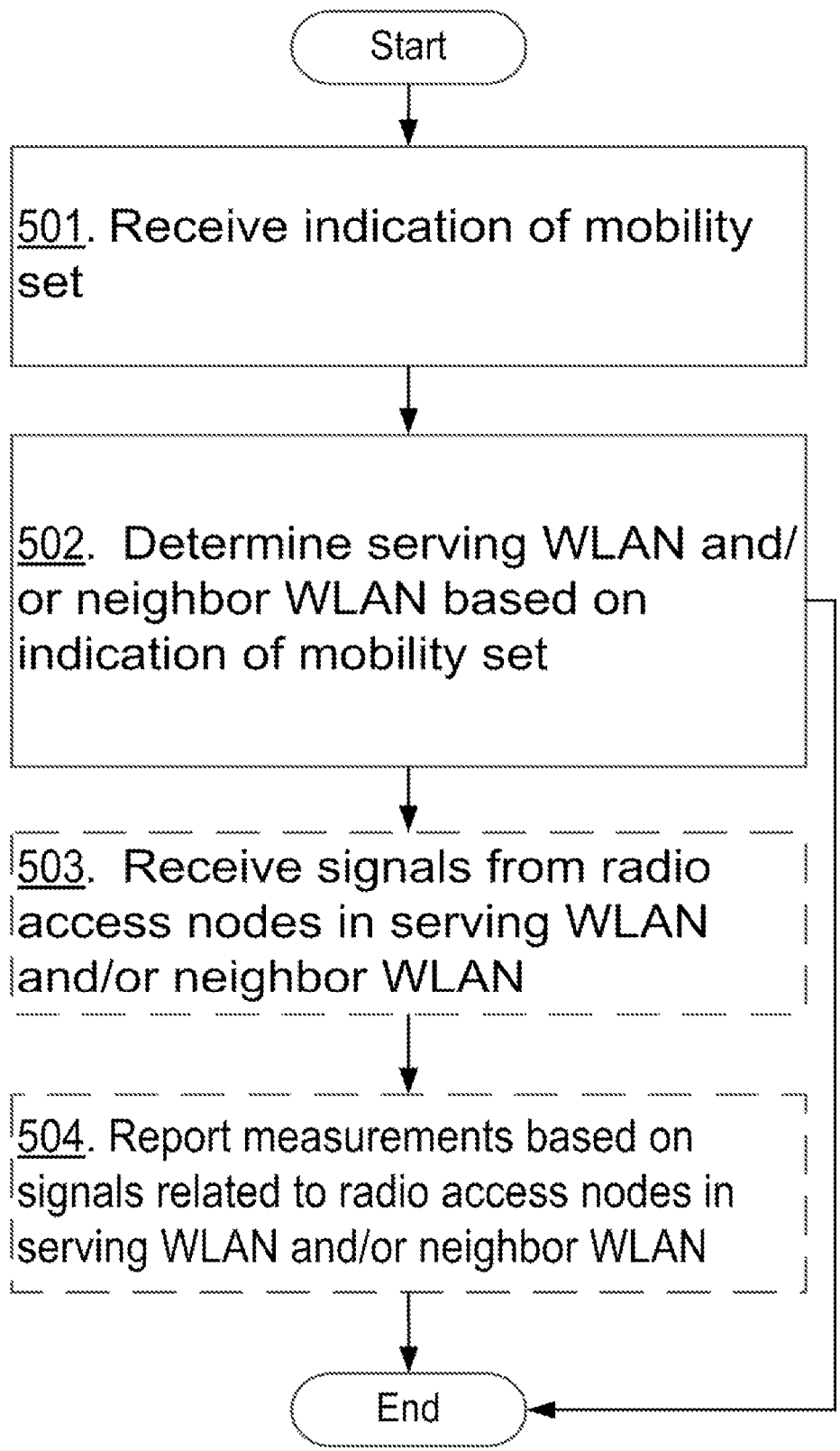
Fig. 5 Method in wireless communications device 250

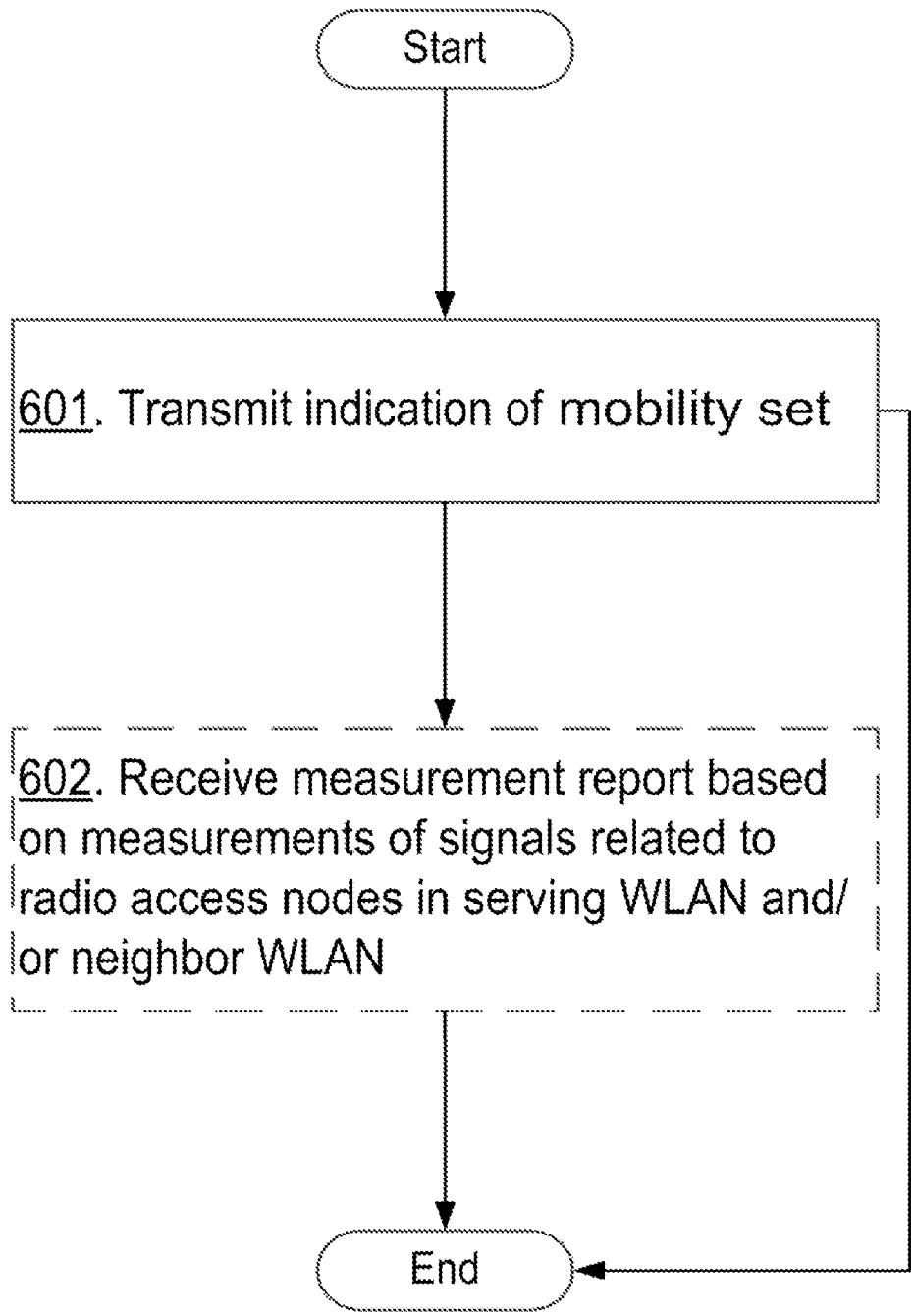
Fig. 6 Method in network node 240

WIRELESS COMMUNICATIONS DEVICE, A NETWORK NODE AND METHODS THEREIN FOR MEASUREMENT REPORTING

CROSS REFERENCE TO RELATED APPLICATION(S)

This application is a 35 U.S.C. § 371 National Phase Entry Application from PCT/SE2016/050739, filed Aug. 5, 2016, which claims priority to U.S. Application No. 62/205,039, filed Aug. 14, 2015. The above identified applications are incorporated by reference.

TECHNICAL FIELD

Embodiments herein relate to a wireless communications device, a network node and methods therein for integration of wireless communications networks with different radio access technologies. More specifically embodiments herein relate to measurement reporting between such wireless communications networks.

BACKGROUND

In a typical radio communications network, wireless communications devices, also known as mobile stations and/or user equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein radio base station nodes are directly connected to the EPC network, i.e. a radio network controller concept as realized in UMTS with a Radio Network Controller (RNC) does not exist. In general, in EPS the functions of an RNC are distributed between eNBs and the core network. As such, the RAN of an EPS has an essentially "flat" architecture comprising radio base stations without being controlled by RNCs.

A simplified architecture of the LTE system is illustrated as a block diagram in FIG. 1a, including eNBs and evolved packet core nodes. The evolved packet core nodes are illustrated as Mobility Management Entities (MMEs) in FIG. 1a. The eNBs are connected with the MMEs with S1 connections. S1 is an interface between eNBs and MMEs. The MME is used as a control node. For example, the MME is responsible for idle mode UE tracking and paging procedure including retransmissions. The MME is further involved in the bearer activation/deactivation process and is also responsible for choosing a Serving GateWay (SGW) for a UE at the initial attach and at time of intra-LTE handover involving evolved packet core node relocation. The MME is further responsible for authenticating the UE or user of the UE.

In modern cellular networks, the need to provide ever increasing data rates to wireless devices may be met by integrating different Radio Access Technologies (RATs) at the radio level. For example, 3GPP studies in Release-13 better ways to integrate LTE and Wireless Local-Area Networks (WLANs), in particular for operator-deployed WLANs. By integrating LTE and WLAN, throughput provided by individual networks may be aggregated by the wireless devices. For this purpose, 3GPP has recently approved a Release-13 work item [RP-150510, ftp://ftp.3gpp.org/tsg_ran/TSG_RAN/TSGR_67/Docs/RP-150510.zip)] which among others aims at standardizing LTE-WLAN aggregation.

The WLAN technology known as "Wi-Fi" has been standardized by IEEE in the 802.11 series of specifications, i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications".

The IEEE 802.11 specifications regulate the functions and operations of the W-Fi Access Points (APs) and wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular RATs. Network operators that are currently serving mobile users with, for example, any of the technologies standardized by the 3GPP, including the radio-access technologies known as LTE, UMTS/Wideband Code-Division Multiple Access (WCDMA), and GSM, see Wi-Fi as a wireless technology that may provide good additional support for users in their regular cellular networks.

There is currently quite intense activity in the area of operator-controlled Wi-Fi in several standardisation organisations. In 3GPP, activities to connect Wi-Fi APs to the 3GPP-specified core network are being pursued, and in the Wi-Fi Alliance (WFA), activities related to certification of Wi-Fi products are being undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g. in peak-traffic-hours and in situations when the cellular network for one reason or another needs to be off-loaded, e.g. to provide requested quality of service, maximise bandwidth or simply for coverage.

For a network operator, offering a mix of two technologies that are standardised in isolation from each other, it is a challenge to provide intelligent mechanisms for co-existence.

A WLAN is a network of one or more APs, and may for example be addressed with Service Set Identifiers (SSID)s, Homogeneous Extended Service Set Identifiers (HESSID)s or Basic Service Set Identifiers (BSSID)s.

FIG. 1b, which is a block diagram, illustrates an LTE network and a WLAN network. The networks may be co-located, which means that the WLAN AP and the eNB are implemented in the same node, or non-colocated, meaning that there is an Xw interface between the eNB and the WLAN AP.

LTE-WLAN Aggregation

LTE-WLAN Aggregation (LWA) is a feature wherein a wireless device, such as a UE, may receive and transmit radio signals using wireless communication links to both an eNB and a Wireless Termination (WT). The WT is a logical node operating in the WLAN. The WT may be implemented in an AP, Access Controller (AC), or another physical node. The wireless device may have a separate data bearer configured on the WLAN side. A data bearer may also be split between an LTE and a WLAN connection. When the bearer is split between the LTE and the WLAN connection, i.e. in the split bearer architecture option of LTE and WLAN aggregation, the downlink data is split on the Packet Data Convergence Protocol (PDCP) layer in the eNB. The eNB may route PDCP Packet Data Units (PDUs) dynamically via eNB Radio Link Control (RLC) protocol to the wireless device directly, or via a backhaul channel to a Secondary eNB (SeNB) or via a WLAN Medium Access Control (MAC) protocol to the wireless device.

In the separate bearer architecture, the lower layers of a bearer are switched to LTE or WLAN. Wth lower layers of a bearer is meant layers below the PDCP layer. This means that all PDCP packets of that bearer are routed via either the LTE or the WLAN side. From an eNB perspective, the separate bearer architecture, that has been called 2C in dual connectivity, may be seen as a static routing decision.

FIG. 1c, which is a block diagram, shows a protocol architecture option 3C for LTE-WLAN aggregation which resembles the Release 12 dual connectivity split bearer architecture in LTE, in which the WT assumes the role of the Secondary eNB (SeNB) in LTE. An adaptation layer may be needed in order to adapt PDCP packets to be transported by WLAN. However, depending on implementation the adaptation layer may be at the eNB or WLAN, or parts of it in each node.

In case of an architecture option 2C, there may be either no eNB RLC protocol below the PDCP protocol of the user plane bearer, in case all packets are routed via WLAN to the wireless device; or there may be no WLAN, i.e. all packets may be routed via LTE to the wireless device.

Furthermore, it is assumed that a GTP-U tunnel is established per UE between eNB and WT and that e.g. flow control feedback would come from the WT to the eNB. The LTE-WLAN aggregation function in the WT would receive PDCP PDUs with bearer ID included from the eNB. These PDCP PDUs would be encapsulated into Etherframes and given to WLAN MAC.

From an eNB perspective, the network interface between the LTE and the WLAN networks, e.g. an Xw interface, is always to the WT. However, the wireless device is connected to at most one AP and there may be multiple APs behind one WT. Further, in legacy WLAN the wireless device controls the mobility decisions, while for WLAN/LTE aggregation the eNB controls, to some extent, the mobility between WLAN nodes. WLAN mobility may comprise the procedure of changing which WLAN the UE is connected to and/or served by.

In some scenarios of LTE-WLAN Aggregation the eNB provides the UE with one or more groups of APs, e.g. identified by SSID, HESSID or BSSID, belonging to one or more WLANs. Among these APs WLAN mobility mechanisms apply and LTE-WLAN aggregation is supported. I.e., the UE may perform mobility among these APs transparent to the eNB. That is the UE is allowed to connect to any of the APs within one or more groups of APs, or groups of WLANs, that are allowed for mobility. A mobility set is a set of WLANs that comprise the WLANs that the eNB has indicated to the UE and which the UE may or is allowed to perform mobility between.

However, the eNB does not necessarily know which AP the UE is connected to. This means that it is "transparent" to the eNB which AP and which WLAN the UE is connected to.

UE mobility from the one or more groups of APs, provided by the eNB, and among which WLAN mobility mechanisms apply, to other groups of APs is controlled by the eNB e.g. based on measurement reports provided by the UE.

In other words, the eNB may control the mobility between WLAN nodes by configuring the UE with one or more WLAN identifiers, e.g. SSIDs, HESSIDs and BSSIDs. For example, the eNB may add and/or remove WLANs from the UE's mobility set, for example based on WLAN measurements provided by the UE.

For example, the UE may report to the eNB when the measurements associated with a WLAN indicate that e.g. the signal from the WLAN is good enough for using the WLAN, i.e. when the measurements fulfil some performance criteria. E.g. a performance criterion may be fulfilled when a measure of the measurement is above or below a threshold. Then that WLAN may be added to the mobility set by the eNB. Likewise, the UE may report to the eNB when the measurements associated with a WLAN indicate that the signal from the WLAN is too poor to be used. Then that WLAN may be removed from the mobility set by the eNB. It should be noted that the eNB may also apply other criteria when deciding when to add/remove WLANs from the UE's mobility set.

The eNB may configure the UE regarding when the UE shall send WLAN measurements to the eNB. One example is that the eNB configures the UE to send a WLAN measurement report based on measurement events.

Document 3GPP TS 36.331 version 12.9.0 describes the 3GPP LTE Rel-12 RRC specification that defines measurements prior to LWA being introduced. Measurements are described in section 5.5 of the above document.

SUMMARY

As mentioned above, 3GPP has recently approved a Release-13 work item which among others aims at standardizing LTE-WLAN aggregation based on a protocol architecture similar to the LTE Dual Connectivity in Rel-12.

As further mentioned above, in LWA the eNB may configure the UE to send a WLAN measurement report based on measurement events. For example, the eNB may configure the UE so that the UE shall send a report to the eNB when a neighbor WLAN becomes a threshold better than a serving WLAN.

In prior art a wireless communications device may base measurement reporting criteria on measurements from serving WLANs and/or neighboring WLANs. However, it is not obvious how the wireless communications device shall determine or select the serving WLANs and/or neighboring WLANs.

According to a mechanism which is currently being developed in 3GPP, a UE may be provided by an eNB with a set of WLAN identifiers which may be referred to as a mobility set. In that scenario the UE is allowed to move freely between WLAN APs which matches these identifiers. That is, the UE is allowed to connect to any of the APs in the mobility set transparently to the eNB, i.e. without asking the eNB for permission to do so. The UE is not allowed to move to, or in other words connect to, other WLANs which do not match the provided identifiers.

With a WLAN mobility set the existing methods for measurements and mobility in LTE cannot be applied when determining whether a WLAN is a serving WLAN or a neighboring WLAN. In LTE the UE is connected to one cell and that is the serving cell. All mobility to neighbor cells is strictly controlled by the network. However, in LWA, the UE may be connected to any of the APs in the mobility set.

In other words, the eNB does not control the mobility of the UE within the mobility set. Instead, the mobility may be based on e.g. UE implementation specific and/or WLAN controlled mobility decision mechanisms. A problem with this is that different UEs may trigger measurement reports under different conditions which may degrade performance of the UEs and degrade performance of the wireless communications network.

If for example three UEs measure the same AP Received Signal Strength Indicator (RSSI) from the same APs, but the three UEs all have implementation specific conditions to define what a neighbour and/or serving WLAN is, the three UEs will send measurement results according to these different definitions. In such a scenario an eNB does not know when receiving these measurements how the three UEs have performed the measurements. E.g. a first UE, UE1, includes measurements from a specific AP, while a second UE, UE2 and a third UE, UE3, do not include measurements from this specific AP. Then the eNB does not know if this difference in measurement reporting is due to UE2 and UE3 not seeing that AP or because UE2 and UE3 interpret neighbour and/or serving WLAN such that they do not send report for that AP. This affects the ability of the eNB to configure the LWA.

Another problem with prior art is that the UE triggers measurement reports which are redundant. With a higher amount of signaling overhead the performance of the wireless communication network is degraded.

An object of embodiments herein is to improve the performance of one or more wireless communications networks. It may be an object of embodiments herein to improve integration of wireless communications networks with different radio access technologies.

The improvement of the performance of the one or more wireless communications networks may be achieved by determining under which conditions a wireless communications device shall send measurement reports to a network node. The improvement of the performance of the one or more wireless communications networks may further be achieved by determining which radio access network nodes to include in the measurement reports to the network node.

According to a first aspect of embodiments herein, the object is achieved by a method performed by a wireless communications device for measurement reporting procedures, such as determining or selecting one or more radio access network nodes for measurement reporting. The measurement reporting comprises reporting measurements associated with a first wireless communications network to a network node operating in a second wireless communications network. The first wireless communications network operates according to a first Radio Access Technology, RAT, and the second wireless communications network operates according to a second RAT.

The wireless communications device receives, from the network node, an indication of one or more radio access network nodes operating in the first wireless communications network, among which one or more radio access network nodes a mobility of the wireless communications device is restricted in the first wireless communications network.

The wireless communications device further determines which radio access network nodes operating in the first wireless communications network are to be used for measurement reporting to the network node, based on the indication of the one or more radio access network nodes among which the mobility of the wireless communications device is restricted in the first wireless communications network.

According to a second aspect of embodiments herein, the object is achieved by a wireless communications device configured to perform the method according to the first aspect.

That is a wireless communications device for determining one or more radio access network nodes for measurement reporting. The measurement reporting comprises reporting measurements associated with a first wireless communications network to a network node operating in a second wireless communications network. The first wireless communications network operates according to a first Radio Access Technology, RAT, and the second wireless communications network operates according to a second RAT.

The wireless communications device is configured to receive, from the network node, an indication of one or more radio access network nodes operating in the first wireless communications network, among which one or more radio access network nodes a mobility of the wireless communications device is restricted in the first wireless communications network.

The wireless communications device is further configured to determine which radio access network nodes operating in the first wireless communications network are to be used for measurement reporting to the network node, based on the indication of the one or more radio access network nodes among which the mobility of the wireless communications device is restricted in the first wireless communications network.

According to a third aspect of embodiments herein, the object is achieved by a computer program product comprising software instructions that, when executed in a processor, performs the method according to the first aspect above.

According to a fourth aspect of embodiments herein, the object is achieved by a wireless communications device for measurement reporting. The wireless communications device comprises a processor and a memory, said memory containing instructions executable by said processor, whereby said wireless communications device is operative to perform the method according to the first aspect above.

According to a fifth aspect of embodiments herein, the object is achieved by a wireless communications device, comprising a receiving module and a determining module, configured to perform the method according to the first aspect.

That is, the wireless communications device comprises the receiving module configured to receive from the network node, an indication of one or more radio access network nodes operating in the first wireless communications network, among which one or more radio access network nodes a mobility of the wireless communications device is restricted in the first wireless communications network.

The wireless communications device further comprises the determining module, configured to determine which radio access network nodes operating in the first wireless communications network are to be used for measurement reporting to the network node, based on the indication of the one or more radio access network nodes among which the mobility of the wireless communications device is restricted in the first wireless communications network.

Since the wireless communications device determines which radio access network nodes are to be used for measurement reporting to the network node, based on the indication of the one or more radio access network nodes among which the mobility of the wireless communications device is restricted, the conditions of measurement reporting will be the same for different wireless communications device, which improves the performance of the wireless communications network.

An advantage of embodiments herein is that they are compatible with the concept of a mobility set in WLAN.

BRIEF DESCRIPTION OF THE DRAWINGS

Examples of embodiments herein are described in more detail with reference to attached drawings in which:

FIG. 5 is a flowchart depicting embodiments of a method for measurement reporting performed by a wireless communication device.

FIG. 6 is a flowchart depicting embodiments of a method performed by a network node.

DETAILED DESCRIPTION

Embodiments herein present a method which is implemented in a wireless communications device and a network node. An eNB is used as an example of the network node in the following, but generally it may be another network node serving the wireless communications device as well, for example for UMTS the applicable network node may also be the RNC. The wireless communications device will be exemplified with a UE.

Figure 1A:
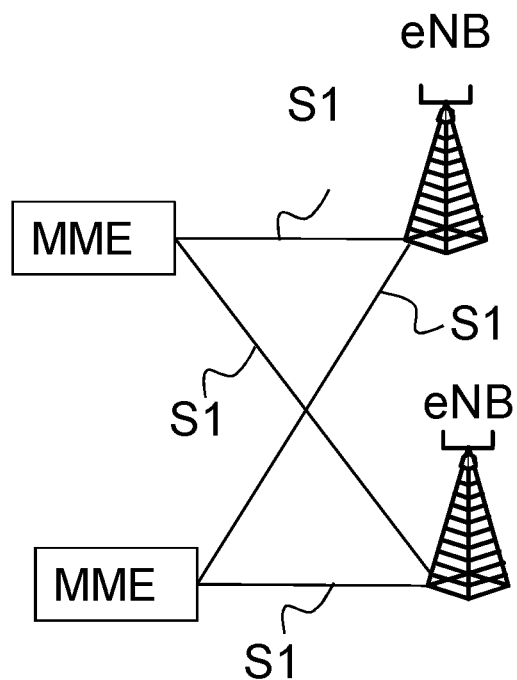
FIG. 1a is a schematic block diagram illustrating a simplified LTE architecture according to prior art.
Figure 1B:
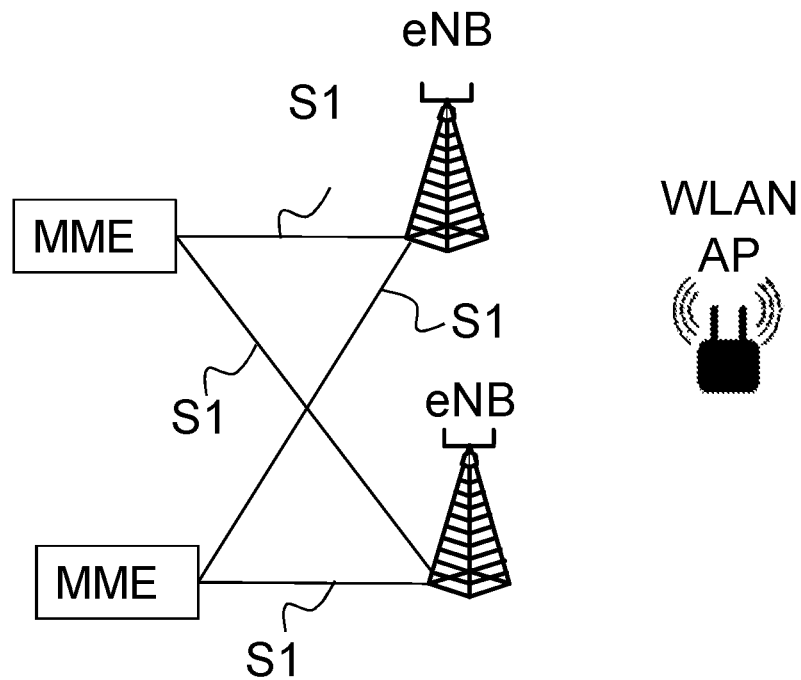
FIG. 1b is a schematic block diagram illustrating LTE and W-Fi networks.
Figure 1C:
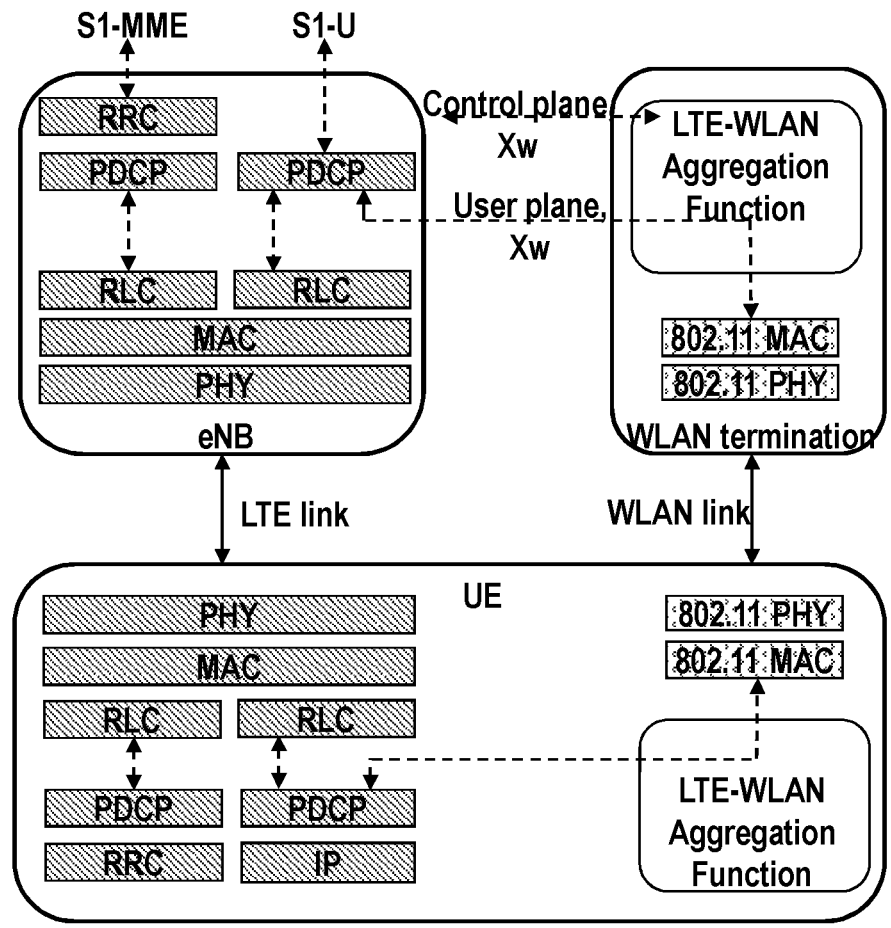
FIG. 1c is a schematic block diagram illustrating protocol architecture option 3C for LTE-WLAN aggregation.
Figure 2:
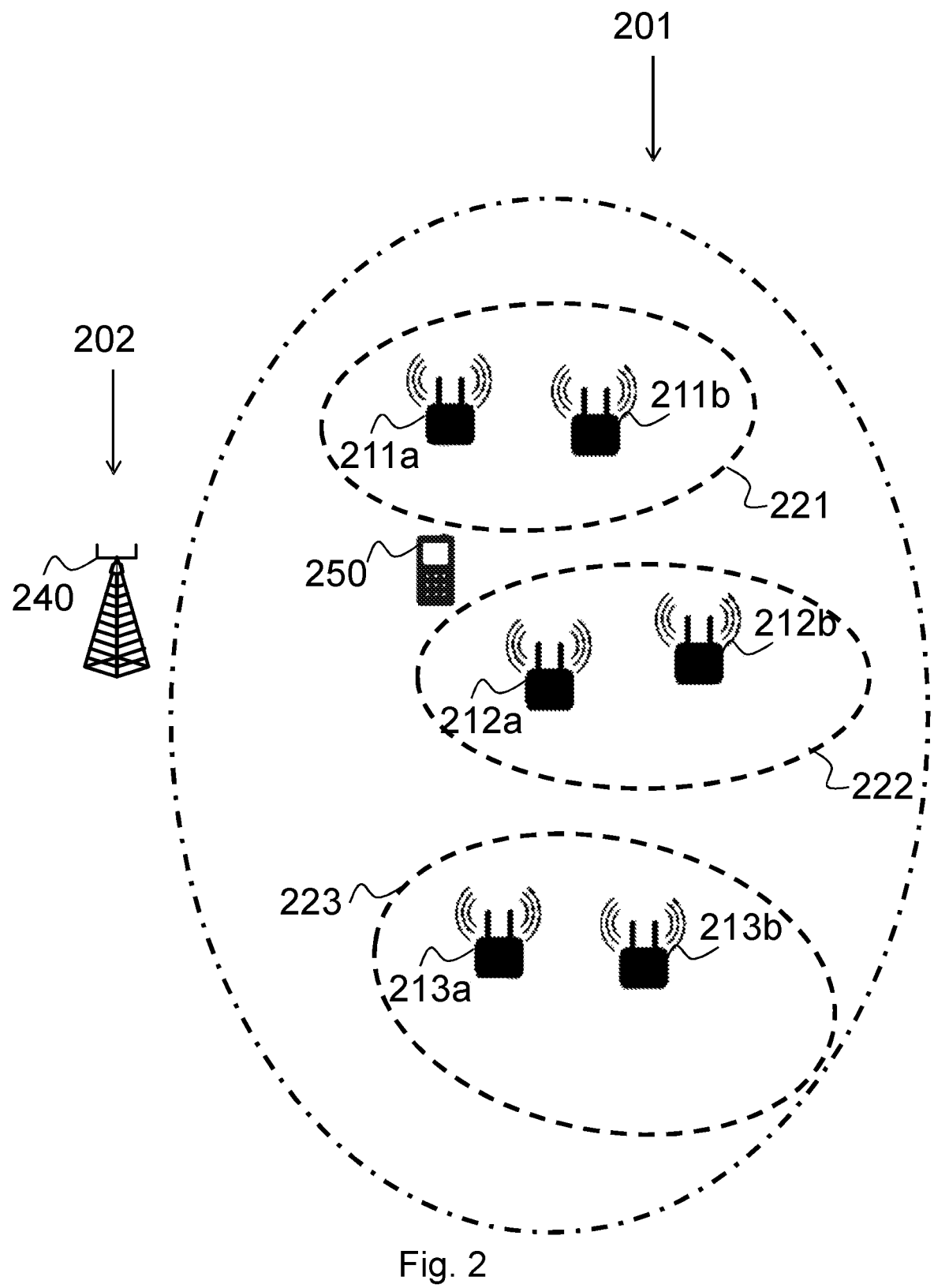
FIG. 2 is a schematic block diagram illustrating a first wireless communication network and a second wireless communication network in which wireless communication networks embodiments herein may be implemented.

Embodiments herein may be implemented in one or more wireless communications networks whereof FIG. 2 depicts parts of a first wireless communications network 201 also known as a radio communications network, a telecommunications network or similar. The first wireless communication network 201 may comprise one or more RAN and one or more CN. The first wireless communication network 201 may use a number of different technologies, such as Wi-Fi, Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. More specifically, the first wireless communications network 201 may operate according to a first RAT.

The first wireless communication network 201 is exemplified herein as a Wi-Fi network, which is an example of a WLAN.

FIG. 2 further depicts parts of a second wireless communications network 202 also known as a radio communications network, a telecommunications network or similar. The second wireless communication network 202 may comprise one or more RAN and one or more CN. The second wireless communication network 202 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Wi-Fi, Worldwide Interoperability for Microwave Access (WiMax), or Ultra Mobile Broadband (UMB), just to mention a few possible implementations. The second wireless communication network 202 is exemplified herein as an LTE network.

In the first wireless communications network 201, radio access nodes capable of communicating with wireless communications devices operate. For example, one or more first radio access nodes 211a, 211b capable of radio communication with wireless communications devices operates in the first wireless communications network 201. The one or more first radio access node 211a, 211b is configured to operate in the first wireless communications network 201. The one or more first radio access nodes 211a, 211b may also be referred to as radio base stations and e.g. eNBs, eNode Bs, base transceiver stations, Access Point Base Stations, base station routers, or any other network units capable of radio communication with wireless communications devices.

There may be further radio access nodes operating in the first wireless communications network 201. For example, there may be one or more second radio access nodes 212a, 212b and one or more third radio access nodes 213a, 213b as illustrated in FIG. 2.

The one or more radio access nodes 211a, 211b, 212a, 212b, 213a, 213b are exemplified as APs in embodiments herein.

As mentioned above, a WLAN is a network of one or more APs, and may be addressed with SSIDs, HESSIDs or BSSIDs.

In embodiments herein, the one or more first radio access nodes 211a, 211b may be referred to as a first radio access network 221. This first radio access network 221 may e.g. be a first WLAN. Further, the one or more second radio access nodes 212a, 212b may be referred to as a second radio access network 222. Yet further, the one or more third radio access nodes 213a, 213b may be referred to as a third radio access network 222. The second radio access network 222 and the third radio access network 223 may also be WLANs.

Even though LTE and WLAN will be used herein as examples of the two RATs it may be possible to apply the embodiments described herein to other combinations of RATs. Such combinations may be combinations of: LTE, UMTS, WLAN, WiMAX, GSM, etc.

In the second wireless communications network 202, network nodes capable of communicating with wireless communications devices operate. For example, a network node 240 capable of communicating with wireless communications devices operates in the second wireless communications network 202. The network node 240 is configured to operate in the second wireless communications network 202. In some embodiments the network node 240 is a network node capable of radio communication, i.e. a radio network node or a radio access node such as a base station. The network node 240 may also be referred to as a radio base station and e.g. an eNB, eNode B, a base transceiver station, Access Point Base Station, base station router, or any other network unit capable of communicating with wireless communications devices.

In some other embodiments the network node 240 is a network node that communicates with the wireless communications devices via a radio network node. In this case the network node 240 may for example be a Radio Network Controller (RNC) in an UMTS network. The RNC is not shown in FIG. 2.

A wireless communications device 250, also known as a mobile station, wireless device, a user equipment and/or a wireless terminal, is capable of operating in the first wireless communications network 201 and in the second wireless communications network 202. For example, the wireless communications device 250 is capable of communicating with the first wireless communications network 201. Further, the wireless communications device 250 is also capable of communicating with the second wireless communications network 202. For example, the wireless communications device 250 is capable of communicating control signals with the second wireless communications network 202 through a signalling bearer via LTE directly. The wireless communications device 250 may also communicate uplink user plane data or control signaling via the first wireless communications network 201, such as a WLAN, to the second wireless communications network 202, such as an LTE network. The first wireless communications network 201 may relay the user plane data to the second wireless communications network 202 via an interface such as an Xw interface. The interface is omitted in FIG. 2.

It should be understood by the skilled in the art that "wireless communications device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell. There may of course be more than one wireless communications device that communicates with the wireless communications networks.

The second wireless communications network 202 may cover a geographical area which is divided into cell areas, which cell areas may be overlapping or partly overlapping. A cell may refer to a geographical area where radio coverage is provided by radio base station equipment at a base station site or at remote locations in Remote Radio Units (RRU).

In embodiments herein the second wireless communications network 202 may comprise a first cell serving wireless communications devices, such as the wireless communications device 250. The network node 240 may communicate with the wireless communications device 250 via the first cell. The first cell is not depicted in FIG. 2.

The cell definition may also incorporate frequency bands and radio access technology used for transmissions, which means that two different cells may cover the same geographical area but using different frequency bands. Each cell is identified by an identity within the local radio area, which is broadcast in the first cell. Another identity identifying the first cell uniquely in the whole of the second wireless communication network 501 is also broadcasted in the first cell. Radio access nodes communicates over the air or radio interface operating on radio frequencies with the wireless communications device 250 within range of the radio access node. The wireless communications device 250 transmits data over the radio interface to the radio access node in Uplink (UL) transmissions and the radio access node transmits data over an air or radio interface to the wireless communications device 250 in Downlink (DL) transmissions.

In some embodiments herein the second wireless communications network 202 further comprises a second cell. The second cell is also not depicted in FIG. 2. The second cell may coincide with the first cell.

The first cell may e.g. be a primary cell, PCell, and the second cell may be a secondary cell, SCell for the wireless communications device 250.

Figure 3:
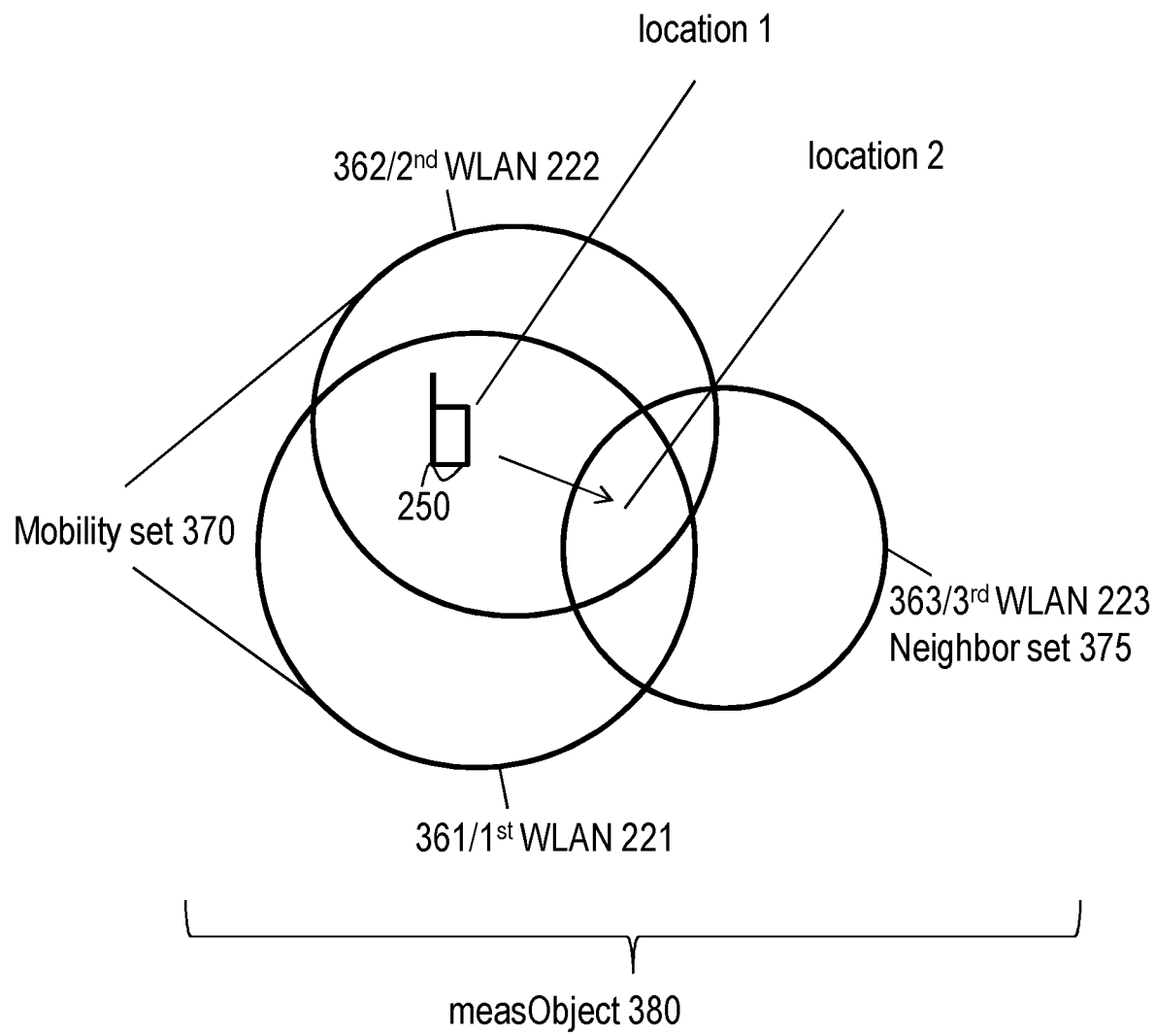
FIG. 3 is a schematic block diagram illustrating a first wireless communication network within which a wireless communications device is moving.

FIG. 3, which is a block diagram, illustrates coverage areas of the radio access networks. A coverage area is a geographical area where radio coverage is provided by the radio access node. The first radio access network 221 provides radio coverage in a first coverage area 361. The second radio access network 222 provides radio coverage in a second coverage area 362. The third radio access network 223 provides radio coverage in a third coverage area 363.

FIG. 3 further illustrates a scenario in which embodiments herein may be implemented. In this scenario the wireless communications device 250 is initially located at a first location 1 in the first coverage area 361 and in the second coverage area 362.

The wireless communications device 250 is further initially configured with the first radio access network 221 and the second radio access network 222 in its mobility set 370. In other words, the first radio access network 221 and the second radio access network 222 are initially comprised in the mobility set 370 of the wireless communications device 250. That means that the mobility of the wireless communications device 250 among the first radio access network 221 and the second radio access network 222 is governed by the mobility mechanisms for the first wireless communications network 201. Use of the first wireless communications network 201 is supported while the wireless communications device 250 is connected to either the first radio access network 221 or the second radio access network 222. To use the first wireless communications network 201 means that the wireless communications device 250 may receive and transmit radio signals using wireless communication links in the first wireless communications network 201.

According to some example embodiments herein the wireless communications device 250 determines the first radio access network 221 and the second radio access network 222, which are comprised in the mobility set 370 of the wireless communications device 250, to be serving WLANs.

Then the wireless communications device 250 moves to another second location 2 where it is also in the third coverage area 363 of the third radio access network 223.

In this position the wireless communications device 250 may further determine the third radio access network 223 to be a neighbor WLAN, i.e. comprised in a neighbor set 375.

It should be noted that the following embodiments are not mutually exclusive. Components from one embodiment may be tacitly assumed to be present in another embodiment and it will be obvious to a person skilled in the art how those components may be used in the other exemplary embodiments.

In embodiments herein the wireless communications device 250, such as a UE, determines or selects one or more radio access network nodes to be used for measurement reporting to the network node 240. The selecting or determining is based on an indication of one or more radio access network nodes 211a, 211b, 212a, 212b which the wireless communications device 250 may perform mobility between. These one or more radio access nodes 211a, 211b, 212a, 212b may be referred to as the mobility set 370.

The network node 240, such as an eNB, may provide the indication. The network node 240 may provide the indication by transmitting it to the wireless communications device 250. The indication may comprise one or more identifiers of one or more radio access network nodes 211a, 211b, 212a, 212b.

For example, the wireless communications device 250 may determine the one or more radio access nodes to be the serving WLAN and/or the neighbor WLAN. The determined serving WLAN and/or the determined neighboring WLAN may then be used for measurement reporting to the network node 240. For example, when an event related to the neighboring WLAN occurs the wireless communications device 250 sends a measurement report regarding this event to the network node 240. The event may be related to a fulfillment of a certain condition related to e.g. the signal of the neighboring WLAN. It should be noted that it may be possible to have conditions related to other metrics than the signal. For example, the conditions may be related to WLAN load, backhaul rate, access delay etc.

Figure 4A:
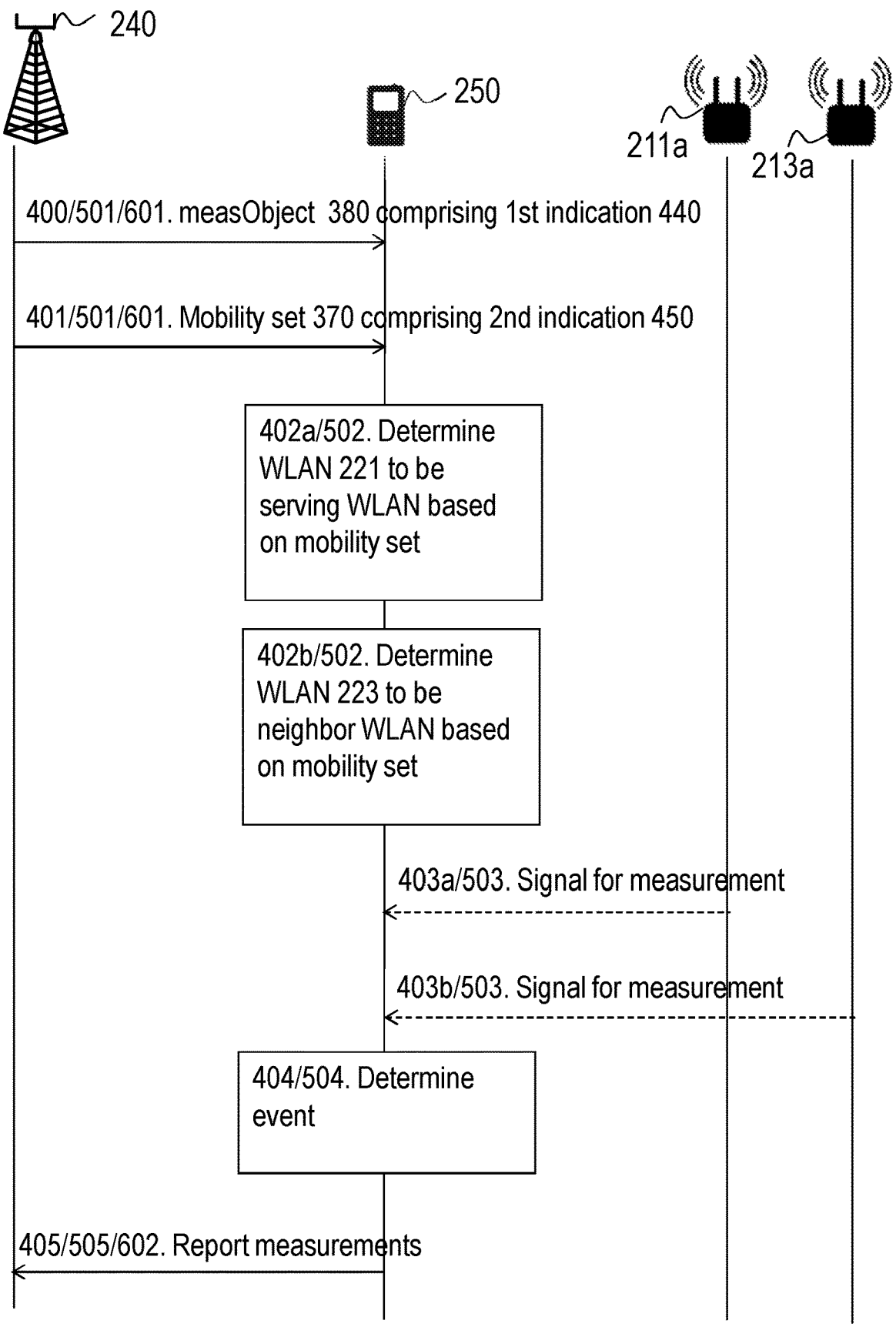
FIG. 4a is a combined signalling diagram and flow chart illustrating embodiments of a method for measurement reporting.

For example, in one embodiment the determining is based on the mobility set 370. As mentioned above, the mobility set 370 is the set of WLANs that comprise the WLANs that the wireless communications device 250 may perform mobility between. The wireless communications device 250 may also consider a measurement object 380, i.e. the WLANs identified by the measurement object 380. In FIGS. 3 and 4a the measurement object 380 is referred to as measObject 380. If the wireless communications device 250 obtains the mobility set 370=(BSSID X and BSSID Y) and the measurement object 380 is SSID=Telia, then according to some embodiments the serving WLAN is a WLAN with BSSID X and BSSID Y. The neighboring WLAN is all WLANs in the measurement object 380, i.e. SSID Telia, except the WLAN with BSSID X and BSSID Y, since these are the mobility set 370.

In another embodiment, e.g. when the wireless communications device 250 has not received the mobility set 370, the wireless communications device 250 determines the neighboring WLAN based on identifiers of the WLANs that the network node 240 has indicated to the wireless communications device 250 to measure on, i.e. based on identifiers of the object of the measurement, e.g. comprised in the measurement object 380. These identifiers may in the absence of a directly indicated mobility set 370 indicate to the wireless communications device 250 that the mobility set 370 is void or that it is empty.

Actions for determining one or more radio access network nodes, such as the radio access nodes in the first, second and third radio access networks 221, 222, 223 to be used for measurement reporting in the first wireless communications system 201 according to embodiments herein will now be described in relation to FIG. 4a, FIG. 4b, FIG. 5 and FIG. 6 and with continued reference to FIG. 2 and FIG. 3.

FIG. 4a is a combined signalling diagram and flow chart that describes a method for determining the one or more radio access network nodes to be used for measurement reporting according to embodiments herein.

Figure 4B:
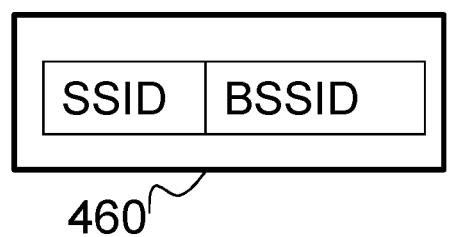
FIG. 4b is a schematic block diagram.

FIG. 4b is a schematic block diagram illustrating an identifier 460 of one or more radio access network nodes.

As mentioned above, the first wireless communications network 201 may be a WLAN, and the second wireless communications network 202 may be a 3GPP network, such as any of: a Long Term Evolution, LTE, network, and a Universal Mobile Telecommunications System, UMTS, network.

Action 400

In order to be configured for measurement reporting the wireless communications device 250 may receive a first indication 440 of one or more radio access network nodes 211a, 211b, 212a, 212b, 213a, 213b that the wireless communications device 250 shall perform measurements on.

In some embodiments the network node 240 transmits the first indication 440 to the wireless communications device 250. The first indication 440 may be comprised in a measurement object 380, also denoted measObject 380 herein. The first indication may comprise one or more identifiers of one or more radio access network nodes 211a, 211b, 212a, 212b, 213a, 213b. The first indication 440 may in some scenarios also indicate that the wireless communications device 250 is not allowed to perform mobility between any radio access network nodes. Thus the first indication may in some scenarios indicate the mobility set 370.

Action 400 is related to actions 501 and 601 below.

Action 401

In order to restrict the mobility of the wireless communications device 250 in the first wireless communications network 201 the wireless communications device 250 receives a second indication 450. The second indication 450 is an indication of one or more radio access network nodes 211*a*, 211*b*, 212*a*, 212*b* which the wireless communications device 250 may and/or is allowed to perform mobility between. The one or more radio access network nodes 211*a*, 211*b*, 212*a*, 212*b* which the wireless communications device 250 may perform mobility between are comprised in the first wireless communications network 201.

The second indication 450 may further comprise one or more identifiers of the one or more radio access network nodes 211*a*, 211*b*, 212*a*, 212*b*. The one or more identifiers of radio access network nodes 211*a*, 211*b*, 212*a*, 212*b* may each be an identifier of one or more radio access network nodes.

The identifiers may be the indication of the one or more radio access network nodes between which the wireless communications device 250 may perform mobility. In other words, the identifiers may be an indication of the mobility set 370.

E.g. in some embodiments herein the wireless communications device 250 receives an indication of the one or more radio access network nodes 211*a*, 211*b*, 212*a*, 212*b* in the mobility set 370 from the network node 240. As mentioned above in relation to FIG. 3, in a scenario herein the first radio access network 221 and the second radio access network 222 are initially comprised in the mobility set 370 of the wireless communications device 250.

In some embodiments the wireless communications device 250 receives an indication that the mobility set 370 is void or empty, i.e. that the mobility set 370 does not comprise any radio access nodes. For example, as mentioned above in relation to action 400, before the wireless communications device 250 has received the mobility set 370 the wireless communications device 250 may receive the first indication 440 of the one or more radio access network nodes 211*a*, 211*b*, 212*a*, 212*b*, 213*a*, 213*b* which the wireless communications device 250 is allowed to, and/or shall perform measurements on in the measurement object 380. The first indication 440 may in some embodiments indicate that the mobility set 370 is void or empty for the moment. The wireless communications device 250 may then determine the neighbour set 375 of WLANs and/or radio access nodes to comprise at least one of the radio access nodes indicated in the measurement object 380.

Action 401 is related to actions 501 and 601 below.

Action 402*a*

As mentioned above, in order for the network node 240 to be able to further control the mobility of the wireless communications device 250 in the first wireless communications network 201, the wireless communications device 250 reports measurements of radio signals associated with the different radio access network nodes in the first wireless communications network 201 to the network node 240.

The network node 240 may control the mobility between radio access nodes by configuring the wireless communications device 250 with one or more identifiers, e.g. SSIDs, HESSIDs and BSSIDs. For example, the network node 240 may add and/or remove WLANs from the mobility set of the wireless communications device 250 based on WLAN measurements provided by the wireless communications device 250.

In embodiments herein the wireless communications device 250 may first determine which radio access network nodes, or in other words which measurements associated with the radio access network nodes to report. The performing of the measurements is described below for actions 403*a*, 403*b*, 503. The reporting of the measurements is described below for actions 405, 505, 602.

The wireless communications device 250 determines, based on at least the second indication 450, that one or more out of the one or more radio access network nodes indicated by the received indication 440, 450 are to be used for measurement reporting to the network node 240 operating in the second wireless communications network 202.

For example, the wireless communications device 250 may determine 402*a* that the first radio access nodes 211*a*, 211*b* which have been indicated as comprised in the mobility set 370 shall be serving WLANs for the purpose of measurement reporting to the network node 240.

Action 402*a* is related to action 502 below.

Action 402*b*

In another example, the wireless communications device 250 determines 402*b* that the third radio access nodes 213*a*, 213*b*, which have been indicated to be comprised in the group of radio access nodes which the wireless communications device 250 is allowed to and/or is required to measure on but is not comprised in the mobility set 370, shall be neighbor WLANs for the purpose of measurement reporting to the network node 240.

By determining which radio access network nodes are to be used for measurement reporting based on the indication, such as the first indication 440 and/or the second indication 450, the conditions of measurement reporting will be the same for different wireless communications device, which improves the performance of the wireless communications network.

The determination may be valid for a time period. The time period may be ended by a timer and/or an event that triggers the ending of the time period.

Action 402*b* is related to action 502 below.

Action 403*a*/403*b*

In order for the wireless communications device 250 to provide information about e.g. the radio link conditions in the first wireless communications network 201 the wireless communications device 250 may e.g. measure a signal strength or a signal quality related to one or more radio signals from a plurality of radio access network nodes 211*a*, 211*b*, 212*a*, 212*b*, 213*a*, 213*b* operating in the first wireless communications network 201.

Action 403*a*/403*b* is related to action 503 below.

Action 404

In order for the second wireless communications network 202 not to be overloaded by measurement reports, the second wireless communications network 202 may configure the wireless communications device 250 with measurement events which triggers the wireless communications device 250 to send measurement reports when certain conditions are fulfilled. Some embodiments herein reduce the number of measurement reports which in turn reduces signaling overhead.

Therefore, in embodiments herein the wireless communications device 250 may determine whether an event related to measurement reporting has occurred. The determination is based on the determined one or more radio access network nodes to be used for measurement reporting to the network node 240, and further based on the measured metric.

An example of such an event is that a neighbour WLAN becomes offset better than a serving WLAN. The expression "a first WLAN becomes better than a second WLAN" may mean that some measure of the signal from the first WLAN is higher or lower than the corresponding measure of the corresponding signal from the second WLAN. For example the signal strength of a first signal associated with a first WLAN may be higher than the signal strength from a second signal associated with a second WLAN. A first WLAN becomes offset better than a second WLAN means that the difference between the two WLANs equals the offset.

Action 404 is related to action 504 below.

Action 405

The wireless communications device 250 may report one or more measurements to the network node 240 operating in the second wireless communications network 202 when the event related to measurement reporting has occurred. The one or more reported measurements are related to the determined one or more radio access network nodes to be used for measurement reporting to the network node 240.

For example, the wireless communications device 250 may report measurements from the serving and/or neighbour WLANs if an event related to measurement reporting has occurred.

Action 405 is related to actions 505 and 602 below.

FIG. 5 is a flowchart that describes a method performed by the wireless communications device 250, such as a UE, for determining the one or more radio access network nodes to be used for measurement reporting according to embodiments herein.

Actions 501

In order to restrict the mobility of the wireless communications device 250 in the first wireless communications network 201 the wireless communications device 250 receives from the network node 240, an indication 440, 450 of one or more radio access network nodes 211a, 211b, 212a, 212b operating in the first wireless communications network 201, among which one or more radio access network nodes 211a, 211b, 212a, 212b a mobility of the wireless communications device 250 is restricted in the first wireless communications network 201.

As mentioned above, the indication 440 may further be an indication of one or more radio access network nodes 211a, 211b, 212a, 212b, 213a, 213b that the wireless communications device 250 shall perform measurements on. In that case the indication 440 further indicates that the wireless communications device 250 is not allowed to perform mobility between any radio access network node.

As mentioned above, in some embodiments herein the indication 440, 450 of the one or more radio access network nodes 211a, 211b, 212a, 212b is an indication of the mobility set 370. An advantage of embodiments herein is that they may be applied together with the concept of a mobility set in WLAN.

When the indication 440, 450 comprises the identifier 460 of the one or more radio access network nodes 211a, 211b, 212a, 212b, the identifier 460 may comprise one or more of: Service Set Identifiers, SSID; Homogeneous Extended Service Set Identifiers, HESSID; Basic Service Set Identifiers, BSSID; Realm; and Public Land Mobile Network, PLMN.

Action 501 is related to actions 400 and 401 above and action 601 below.

Action 502

As mentioned above, in order for the network node 240 to be able to further control the mobility of the wireless communications device 250 in the first wireless communications network 201, the wireless communications device 250 determines which radio access network nodes 213a, 213b operating in the first wireless communications network 201 are to be used for measurement reporting to the network node 240, based on the indication 440, 450 of the one or more radio access network nodes 211a, 211b, 212a, 212b among which the mobility of the wireless communications device 250 is restricted in the first wireless communications network 201.

By determining which radio access network nodes are to be used for measurement reporting based on the indication 440, 450 the conditions of measurement reporting will be the same for different wireless communications device, which improves the performance of the wireless communications network.

In some embodiments herein the radio access network nodes 211a, 211b, 212a, 212b, 213a, 213b are WLAN APs. For those embodiments the determining comprises determining any one or more out of: a serving WLAN, and a neighbor WLAN, comprising the radio access network nodes 213a, 213b to be used for measurement reporting.

In some embodiments the determining comprises determining at least one of the radio access network nodes 211a, 211b, 212a, 212b in the mobility set 370 to be the serving WLAN, and radio access network nodes not in the mobility set 370 to be neighbouring WLANs.

In some other embodiments the determining 402a, 402b, 502 comprises determining a connected radio access network node 211a, 211b, 212a, 212b in the mobility set 370 to be the serving WLAN and radio access network nodes not in the mobility set 370 to be neighbouring WLANs. The wireless communications device 250 is connected to the connected radio access network node 211a, 211b, 212a, 212b.

In yet some further embodiments the determining 402a, 402b, 502 comprises determining a connected radio access network node 211a, 211b, 212a, 212b in the mobility set 370 to be the serving WLAN and radio access network nodes not connected to the wireless communications device 250 to be neighbouring WLANs.

In some embodiments herein the determining 402a, 402b, 502 further comprises determining the radio access network node 211a, 211b, 212a, 212b in the mobility set 370 to be the serving WLAN if the identifier 460 of the one or more radio access network nodes 211a, 211b, 212a, 212b is a specific identifier of a specific radio access network node 211a, 211b, 212a, 212b, such as a specific BSSID identifier. This will be further explained later.

The determination may be valid for a time period. The time period may be ended by a timer and/or an event that triggers the ending of the time period.

Action 502 is related to actions 402a and 402b above.

Action 503

In order for the wireless communications device 250 to provide information about e.g. the radio link conditions in the first wireless communications network 201 the wireless communications device 250 may measure a metric related to one or more radio signals from a plurality of radio access network nodes 211a, 211b, 212a, 212b, 213a, 213b operating in the first wireless communications network 201.

The wireless communications device 250 may e.g. measure a signal strength or a signal quality.

Action 503 is related to action 403a/403b above.

Action 504

As mentioned above in action 404 the wireless communications device 250 may determine, based on the indication 440, 450 of the mobility set 370, and further based on the measured metric, whether an event related to measurement reporting has occurred.

In some embodiments it is determined that the event has occurred if all radio access network nodes 211a, 211b, 212a, 212b in the mobility set 370 are worse than a threshold. This has the effect that the wireless communications device 250 does not trigger unnecessary measurements reports, which reduces the amount signaling overhead.

In some other embodiments it is determined that the event has occurred if a radio access network node 213a, 213b not in the mobility set 370 becomes better than a threshold.

In yet some further embodiments it is determined that the event related to measurement reporting has occurred if a radio access network node 213a, 213b not in the mobility set 370 becomes better than a first threshold, and if all radio access network nodes 211a, 211b, 212a, 212b in the mobility set 370 are worse than a second threshold.

Action 504 is related to action 404 above.

Action 505

The wireless communications device 250 may report one or more measurements to the network node 240 operating in the second wireless communications network 202 when the event related to measurement reporting has occurred.

Action 505 is related to action 405 above and action 602 below.

FIG. 6 is a flowchart that describes a method performed by the network node 240, such as an eNB, for assisting the wireless communications device 250 in determining the one or more radio access network nodes to be used for measurement reporting according to embodiments herein.

Action 601

In some embodiments the network node 240 transmits the first indication 440 to the wireless communications device 250. The first indication 440 may be comprised in the measurement object 380.

The network node 240 may provide the second indication 450 by transmitting it to the wireless communications device 250.

Action 602

The network node 240 may receive the measurement report related to the one or more signals received by the wireless communications device 250. For example, the measurement report may relate to serving WLANs, such as the first radio access network 221, and/or neighbour WLANs, such as the third radio access network 223.

The method for measurement reporting described above may be performed by the wireless communications device 250. The wireless communications device 250 may comprise the modules depicted in FIG. 7 for determining the one or more radio access network nodes to be used for measurement reporting.

To do so the wireless communications device 250 is configured for measurement reporting. As mentioned above, in the context of embodiments herein the measurement reporting comprises reporting measurements associated with the first wireless communications network 201 to the network node 240 operating in the second wireless communications network 202. In other words, the measurement reporting comprises reporting measurements associated with one or more of the radio access network nodes 211a, 211b, 212a, 212b, 213a, 213b operating in the first wireless communications network 201.

As further mentioned above, the first wireless communications network 201 operates according to the first RAT, and the second wireless communications network 202 operates according to the second RAT.

The wireless communications device 250 is configured to, e.g. by means of the receiving module 710 configured to, receive, from the network node 240, the indication 440, 450 of the one or more radio access network nodes 211a, 211b, 212a, 212b operating in the first wireless communications network 201, among which one or more radio access network nodes 211a, 211b, 212a, 212b a mobility of the wireless communications device 250 is restricted in the first wireless communications network 201.

Thus action 501 may be performed by means such as the receiving module 710 in the wireless communications device 250. The receiving module 710 may be implemented, at least in part, by a processor 780 in the wireless communications device 250.

The wireless communications device 250 is further configured to, e.g. by means of the determining module 720 configured to, determine which radio access network nodes operating in the first wireless communications network 201 are to be used for measurement reporting to the network node 240, based on the indication 440, 450 of the one or more radio access network nodes 211a, 211b, 212a, 212b among which the mobility of the wireless communications device 250 is restricted in the first wireless communications network 201.

The wireless communications device 250 may be configured to, e.g. by means of the determining module 720 configured to, determine any one or more out of: a serving WLAN, and a neighbor WLAN, comprising the radio access network nodes 213a, 213b to be used for measurement reporting.

In some embodiments the wireless communications device 250 is configured to, e.g. by means of the determining module 720 configured to, determine at least one of the radio access network nodes 211a, 211b, 212a, 212b in the mobility set 370 to be the serving WLAN, and radio access network nodes not in the mobility set 370 to be neighbouring WLANs.

In some other embodiments the wireless communications device 250 is configured to, e.g. by means of the determining module 720 configured to, determine a connected radio access network node 211a, 211b, 212a, 212b in the mobility set 370 to be the serving WLAN and radio access network nodes not in the mobility set 370 to be neighbouring WLANs.

In yet some further embodiments the wireless communications device 250 is configured to, e.g. by means of the determining module 720 configured to, determine a connected radio access network node 211a, 211b, 212a, 212b in the mobility set 370 to be the serving WLAN and radio access network nodes not connected to the wireless communications device 250 to be neighbouring WLANs.

In yet some further embodiments the wireless communications device 250 is configured to, e.g. by means of the determining module 720 configured to, determine the radio access network node 211a, 211b, 212a, 212b in the mobility set 370 to be the serving WLAN if the identifier 460 of the one or more radio access network nodes 211a, 211b, 212a, 212b is a specific identifier of a specific radio access network node 211a, 211b, 212a, 212b, such as a specific BSSID identifier.

Thus action 502 may be performed by means such as the determining module 720 in the wireless communications device 250. The determining module 720 may be implemented, at least in part, by the processor 780 in the wireless communications device 250.

The wireless communications device 250 may be further configured to, e.g. by means of the measuring module 730 configured to, measure a metric related to one or more radio signals from a plurality of radio access network nodes 211a, 211b, 212a, 212b, 213a, 213b operating in the first wireless communications network 201.

Thus action 503 may be performed by means such as the measuring module 730 in the wireless communications device 250. The measuring module 730 may be implemented, at least in part, by the processor 780 in the wireless communications device 250.

The wireless communications device 250 may be further configured to, e.g. by means of the determining module 720 and/or a reporting module 740 configured to, determine, based on the indication 440, 450 of the one or more radio access network nodes 211a, 211b, 212a, 212b among which the mobility of the wireless communications device 250 is restricted in the first wireless communications network 201, and further based on the measured metric, whether an event related to measurement reporting has occurred.

The wireless communications device 250 may be further configured to, e.g. by means of the reporting module 740 configured to, report measurements when the event has occurred.

In some embodiments the wireless communications device 250 is configured to, e.g. by means of the reporting module 740 configured to, determine that the event has occurred if all radio access network nodes 211a, 211b, 212a, 212b among which the mobility of the wireless communications device 250 is restricted are worse than a threshold.

In some other embodiments the wireless communications device 250 is configured to, e.g. by means of the reporting module 740 configured to, determine that the event has occurred if a radio access network node 213a, 213b not in the mobility set 370 becomes better than a threshold.

In yet some other embodiments the wireless communications device 250 is configured to, e.g. by means of the reporting module 740 configured to, determine that the event related to measurement reporting has occurred if
a radio access network node 213a, 213b not in the mobility set 370 becomes better than a first threshold, and if
all radio access network nodes 211a, 211b, 212a, 212b in the mobility set 370 are worse than a second threshold.

Thus action 504 may be performed by means such as the determining module 720 and/or the reporting module 740 in the wireless communications device 250.

Further, action 505 may be performed by means such as the reporting module 740 in the wireless communications device 250. The reporting module 740 may be implemented, at least in part, by the processor 780 in the wireless communications device 250.

The method for assisting the wireless communications device 250 to perform measurement reporting described above may be performed in the network node 240. The network node 240 may comprise the modules depicted in FIG. 8 for assisting the wireless communications device 250 in determining the one or more radio access network nodes to be used for measurement reporting.

Action 601 may be performed by means such as a transmitting module 810 in the network node 240. The transmitting module 810 may be implemented by a processor 880 in the network node 240.

Action 602 may be performed by means such as a receiving module 820 in the network node 240.

Embodiments

Embodiments below will be exemplified with LTE as the second wireless communications network 202 and with a WLAN, e.g. W-Fi, as the first wireless communications network 201.

Embodiments herein make use of the mobility set 370. The mobility set 370 may be defined in different ways. Some examples of how the wireless communications device 250 may determine serving and neighbor WLANs are provided below.

In some first embodiments the wireless communications device 250 determines WLANs in the mobility set 370, such as the first radio access network 221, to be serving WLANs. The wireless communications device 250 further determines other WLANs, such as the third radio access network 223, to be neighbor WLANs. The other WLANs have been indicated to the wireless communications device 250 to be WLANs to be measured on. For example, the other WLANs may be indicated by the measurement object 380 but are not comprised in the mobility set 370. The WLANs in the mobility set 370 may of course also have been indicated to the wireless communications device 250 to be WLANs to be measured on, e.g. by the measurement object 380.

In other words, the wireless communications device 250 selects the serving and/or neighbor WLANs based on the mobility set 370.

In some second embodiments the wireless communications device 250 determines that the WLAN which the wireless communications device 250 is connected to is the serving WLANs and determines that other WLANs are neighbor WLANs. The WLAN which the wireless communications device 250 is connected to is comprised in the mobility set 370. Thus in these second embodiments the wireless communications device 250 determines the serving WLAN and/or the neighbor WLAN based on the mobility set 370 and further based on which WLAN the wireless communications device 250 is connected to.

In some third embodiments the wireless communications device 250 determines that the WLAN which the wireless communications device 250 is connected to is the serving WLAN and WLANs outside the mobility set 370 are determined to be neighbor WLANs.

In some fourth embodiments the wireless communications device 250 determines a WLAN to be a serving WLAN only if it is addressed by a specific WLAN identifier addressing that specific WLAN. Such a specific identifier may e.g. be a BSSID. That is, the wireless communications device 250 does not determine a WLAN to be a serving WLAN if the WLAN only matches a group-identifier. Such a group identifier may e.g. be an SSID or HESSID. This will be further explained and exemplified below when group identifiers are discussed.

Advantages of the Embodiments Herein

It will be well defined when the wireless communications device 250 shall send measurement reports regarding WLAN to the network node 240 which ensures that the network node 240 will receive WLAN measurements from different wireless communications devices during the same conditions. Further, embodiments herein are compatible with the concept of a mobility set in WLAN.

Also some embodiments ensure that the wireless communications device 250 does not trigger unnecessary measurements reports. This reduces the amount of signaling overhead.

Further Details of Embodiments

In embodiments herein it is described how the wireless communications device 250, such as a UE, will handle WLANs in a mobility set 370 when operating a WLAN measurement reporting function. In the following text the wireless communications device 250 will be referred to as a UE.

In the existing measurement reporting mechanism the UE is configured by the network, e.g. by the eNB, to send measurement reports based on some events. One example of such a measurement event for LTE measurements is that a neighbor cell becomes a threshold better than the serving cell. The UE will when this condition is fulfilled send a message comprising a measurement report to the eNB.

3GPP is currently in the process of defining WLAN measurement reporting according to which the UE shall report measurements related to WLAN. Also for these measurements the network may configure the UE with measurement events which triggers the UE to send measurement reports when certain conditions are fulfilled.

Example measurement events may comprise:

Event W1: PCell becomes worse than a first threshold and neighbor WLAN becomes better than a second threshold.

Event W2: PCell becomes better than the first threshold and serving WLAN becomes worse than the second threshold.

Event W3: Neighbor WLAN becomes offset better than serving WLAN.

Event W4: Neighbor WLAN becomes better than the first threshold and serving WLAN becomes worse than the second threshold.

"PCell" mentioned above refers to the UEs primary LTE serving cell, i.e. not a WLAN. For clarity, the LTE-specific parts of the measurement report conditions are omitted in the following.

It should also be noted that some of the measurement events are only applicable if the UE is configured with a mobility set 370. Thus for some embodiments it is assumed that a mobility set 370 is configured if that is necessary. These embodiments are related to events W2, W3 and W4.

In case of event W1 neighboring WLANs may be those WLANs which are addressed by the measObject and is not in the mobility set 370. So that means that since there is no mobility set 370 then all WLANs addressed by measObject may be determined to be neighbor WLANs.

Definition of Serving WLAN vs. Neighbor WLAN

When applying measurement reporting events, for example as those described above, it needs to be defined what a serving WLAN is and what a neighbor WLAN is. Some options are listed in Table 1

It should be noted that the network may blacklist neighbor or serving WLANs and this may imply that the UE will not consider blacklisted WLANs.

First Embodiments: WLANs in the Mobility Set are Determined to be "Serving WLANs" and Other WLANs are Determined to be "Neighbor WLANs"

In some of the first embodiments the UE determines any WLAN in the mobility set to be a "serving WLAN" and any WLAN not in the mobility set 370 is determined to be a "neighbor WLAN".

Below the resulting definitions of the W1-W4 measurement events will be described while applying the above definition of "serving WLAN" and "neighbor WLAN". A person skilled in the art may however be able to apply the above definition also to other types of events, i.e. other than W1 to W4.

It shall be noted that only WLANs corresponding to the WLANs given in the measObject, i.e. the object of the measurement, are considered as potential neighbor WLANs. The measObject may be obtained, e.g. from the network node 240, as a list of BSSIDs, SSIDs, HESSIDs.

Resulting W1 Definitions:

The W1 event indicates that one WLAN becomes better than a threshold and a possible eNB reaction to receiving such measurement report is to add the WLAN to the UE's mobility set 370.

Event W1: A WLAN not in the UE's mobility set 370 becomes better than the second threshold.

OR (another possible definition of W1, while implicitly applying the above definition of "serving" and "neighboring" WLANs)

Event W1': A neighbor WLAN becomes better than the second threshold.

Resulting W2 Definitions:

The W2 event indicates, with the above definition, that at least one WLAN of the mobility set 370 becomes worse than a threshold. Different definitions are possible leading to different measurement report triggering.

If all WLANs in the mobility set 370 become worse than a threshold, the eNB may e.g. stop the LTE/WLAN aggregation or the LTE/WLAN interworking for the UE. Therefore one W2 definition is:

Event W2: All WLANs in the UE's mobility set 370 become worse than the second threshold.

When the WLAN in the mobility set 370 with the highest RSSI, i.e. which may be considered the best WLAN, becomes worse than the second threshold that means that all

TABLE 1

| Possible combinations of assumptions | neighbor WLAN = any WLAN the UE is not connected to | neighbor WLAN = any WLAN outside of the mobility set |
|---|---|---|
| serving WLAN = the WLAN the UE is connected to | serving WLAN = the WLAN the UE is connected to and neighbor WLAN = any WLAN the UE is not connected to | serving WLAN = the WLAN the UE is connected to and neighbor WLAN = any WLAN outside of the mobility set |
| serving WLAN = any WLAN in the mobility set | serving WLAN = any WLAN in the mobility set and neighbor WLAN = any WLAN the UE is not connected to (not considered, since serving and neighbor overlapping) | serving WLAN = any WLAN in the mobility set and neighbor WLAN = any WLAN outside of the mobility set |

WLANs in the mobility set 370 become worse than the second threshold and hence the behavior is the same as for the Event W2-option above:

Event W2': The best WLAN, e.g. with highest RSSI, in the UE's mobility set 370 becomes worse than second threshold.

When only one WLAN of the mobility set 370 becomes worse than a threshold, eNB may e.g. remove this WLAN from the mobility set 370. Therefore another W2 definition is:

Event W2": A WLAN in the UE's mobility set 370 becomes worse than second threshold.

Resulting W3 Definitions:

When a WLAN which is outside the mobility set 370 becomes offset better than all WLANs in the mobility set 370 then the UE may send a measurement report. A possible eNB response to this is that the WLAN outside the mobility set 370 is added to the mobility set 370 and all WLANs in the mobility set 370 are removed from the mobility set 370. This is especially useful if there is only one WLAN in the mobility set 370 which should be replaced by another, possibly better, one.

Event W3: A WLAN outside the mobility set 370 becomes offset better than all WLAN in the mobility set 370.

When a WLAN which is outside the mobility set 370 becomes offset better than the WLAN in the mobility set 370 with the highest RSSI, i.e. which may be considered the best WLAN, that means that the WLAN outside the mobility set 370 is better than all WLANs in the mobility set 370 and hence the behavior is the same as for Event W3-option.

Event W3': A WLAN outside the mobility set 370 becomes offset better than the best WLAN, e.g. with highest RSSI, in the mobility set 370.

When a WLAN which is outside the mobility set 370 becomes offset better than any WLAN of the mobility set 370, the eNB may e.g. add the WLAN outside the mobility set 370 and remove the WLAN in mobility set 370 which is offset worse. Therefore another W3 definition is:

Event W3": A WLAN outside the mobility set 370 becomes offset better than a WLAN in the mobility set 370. The WLAN in the mobility set 370 with which the WLAN which is outside the mobility set 370 is compared may for example have the second highest RSSI.

Resulting W4 Definitions:

The W4 event comprises a combination of options for W1 and options for W2. For example a combination of W1 and W2 is described below. This means that when a WLAN which is outside the mobility set 370 becomes better than a first threshold and all WLAN in the mobility set 370 becomes worse than a second threshold, then it may be beneficial for the eNB to add the WLAN which becomes better than the first threshold to the mobility set 370 and remove the WLAN in the mobility set 370 which became worse than the second threshold.

Event W4—combination of W1 and W2: A WLAN outside the mobility set 370 becomes better than the first threshold and all WLANs in the mobility set 370 become worse than the second threshold.

As indicated, W4 events may be seen as combinations of options for W1 and W2 and hence different W4-options may be envisaged by combining different options of W1 and W2.

Second Embodiments: WLAN that the UE is Connected to is Determined to be "Serving WLAN" and Other WLANs are Determined to be "Neighbor WLANs"

In some embodiments the UE considers only the WLAN which the UE is currently connected to as the "serving WLAN" and other WLANs, which may be in the UE's mobility set 370, are considered as "neighboring" WLANs. This makes the above listed events have the following meaning.

Below the resulting definitions of the W1-W4 measurement events will be described while applying the definition of the second embodiments of "serving WLAN" and "neighbor WLAN". A person skilled in the art may however be able to apply the above definition also to other types of events, other than W1 to W4.

Resulting W1 Definitions:

The W1 event triggers when a WLAN becomes better than a threshold and a possible eNB reaction to receiving such measurement report is to add that WLAN to the UE's mobility set 370.

Event W1: A WLAN the UE is not connected to becomes better than second threshold.

Resulting W2 Definitions:

The W2 event triggers when the WLAN that the UE is connected to, if any, becomes worse than a threshold and a possible eNB reaction to receiving such measurement report is to remove that WLAN from the UE's mobility set 370.

Event W2: A WLAN the UE is connected to becomes worse than second threshold.

Resulting W3 Definitions:

The W3 event triggers when a WLAN which the UE is not connected to becomes offset better than the WLAN that the UE is connected to. A possible eNB response to this is that the WLAN that the UE is not connected to is added to the mobility set 370, if not already in the mobility set 370, and the WLAN the UE is connected to is removed from the mobility set 370.

Event W3: A WLAN the UE is not connected to becomes offset better than the WLAN the UE is connected to.

Resulting W4 Definitions:

The W4 event comprises a combination of W1 and W2. This means that when a WLAN which the UE is not connected to becomes better than a first threshold and the WLAN that the UE is connected to becomes worse than a second threshold then it may be beneficial for the eNB to add the WLAN which becomes better than first threshold to the mobility set 370, if not already in the mobility set 370, and remove the WLAN in the mobility set 370 which became worse than the second threshold.

Event W4 (combination of W1 and W2): A WLAN the UE is not connected to becomes better than the first threshold and the WLAN the UE is connected to becomes worse than the second threshold.

Third Embodiments: The WLAN which the UE is Connected to is Determined to be a "Serving WLAN" and WLANs Outside the Mobility Set 370 are Determined to be Neighbor WLANs In some embodiments the UE considers only the WLAN which the UE is currently connected to as the "serving WLAN" and WLANs outside the mobility set 370 are considered as "neighboring" WLANs. This makes the above listed events have the following meaning.

Below the resulting definitions of the W1-W4 measurement events are described while applying the above definition of "serving WLAN" and "neighbor WLAN". A person skilled in the art may however be able to apply the above definition also to other types of events, other than W1 to W4.

Resulting W1 Definitions:

The W1 event triggers when a WLAN becomes better than a threshold and a possible eNB reaction to receiving such measurement report is to add that WLAN to the UE's mobility set 370.

Event W1: A WLAN not in the mobility set 370 becomes better than the second threshold.

Resulting W2 Definitions:

The W2 event triggers when the WLAN that the UE is connected to, if any, becomes worse than a threshold. A possible eNB reaction to receiving such a measurement report is to remove that WLAN from the UE's mobility set 370.

Event W2: A WLAN the UE is connected to becomes worse than the second threshold.

Resulting W3 Definitions:

For these embodiments the W3 event triggers when a WLAN which is not in the UE's mobility set 370 becomes offset better than the WLAN that the UE is connected to. A possible eNB response to this is that the WLAN not in the UE's mobility set 370, which was better, is added to the mobility set 370 and the WLAN that the UE is connected to is removed from the mobility set 370.

Event W3: A WLAN not in the UE's mobility set 370 becomes offset better than the WLAN the UE is connected to.

Resulting W4 Definitions:

The W4 event comprises a combination of W1 and W2. This means that when a WLAN which is not in the UE's mobility set 370 becomes better than a first threshold and the WLAN that the UE is connected to becomes worse than a second threshold, then it may be beneficial for the eNB to add the WLAN which becomes better than first threshold to the mobility set 370 and remove the WLAN in the mobility set 370 which WLAN became worse than the second threshold.

Event W4 (combination of W1 and W2): A WLAN not in the UE's mobility set 370 becomes better than the first threshold and the WLAN the UE is connected to becomes worse than the second threshold.

Handling of Group WLAN Identifiers

The UE may be configured in the mobility set 370 with a WLAN identifier which is addressing a group of WLANs, e.g. an SSID or HESSID. These types of identifiers may be referred to as group-identifiers.

In contrary to a WLAN identifier addressing a group of WLANs, the UE may be configured with a WLAN identifier which is addressing only a specific WLAN, i.e. a WLAN AP, e.g. a BSSID. These types of identifiers may be referred to as specific-identifiers.

If the UE is configured in the mobility set 370 with a group-identifier, the UE may determine any WLANs matching that group-identifier to be a serving WLAN. The UE may further determine other WLANs to be neighbor WLANs, unless those other WLANs match some other identifier in the mobility set since then they will be serving WLANs. In other words, some WLANs may be considered serving WLANs due to other WLAN identifiers in the mobility set 370, i.e. a WLAN is considered a serving WLAN if it matches any WLAN identifier in the mobility set. For example, if the UE is configured with an SSID=X in the mobility set 370 then the UE may determine all WLANs which matches SSID=X to be a serving WLAN while other WLANs—not matching SSID=X and also does not match other WLAN identifiers in the mobility set 370—are determined to be neighboring WLANs.

In some other embodiments the UE determines a WLAN to be a serving WLAN if it is addressed by a specific-identifier but not if it only matches a group-identifier. The UE may further determine other WLANs to be neighbor WLANs. For example, if the UE is configured with an SSID=X and BSSID=A in the mobility set 370 and these WLAN IDs are overlapping, the UE may determine a WLAN to be a serving WLAN if it matches BSSID=X and determine other WLANs—even if they match SSID=X—to be neighbor WLANs.

WLAN identifiers may be of diffident types including: SSIDs, BSSIDs, HESSIDs, Realm, PLMN. A WLAN may be part of and/or connected to one or more Realms. A realm is a domain which one may authenticate to. For example, a first operator operating WLANs located in airports may have an agreement with a second operator such that the customers of the second operator, and thus their wireless communications devices, may connect to the first operator's WLANs. Then the first operator's WLANs will be connected to both the first operator's realm and the second operator's realm.

It should be noted that WLANs in general have several identifiers associated with them. For example a WLAN AP may have a BSSID, an SSID a HESSID, etc.

As mentioned above, an object of embodiments herein is to improve the performance of one or more wireless communications networks.

Embodiments herein address at least some of the above identified problems by determining which radio access network nodes to include in the measurement reports to the network node 240. For example, in some embodiments herein the wireless communications device 250, such as a UE, determines the serving WLAN and/or the neighbor WLAN based on an indication of the mobility set 370.

According to some embodiments herein, the object is achieved by a method performed by the wireless communications device 250 for measurement reporting procedures.

E.g. the method is used for determining or selecting one or more radio access network nodes for measurement reporting. The wireless communications device 250 may determine a serving WLAN and/or a neighbour WLAN.

According to some other embodiments herein, the object is achieved by a method performed by the network node 240 for assisting the wireless communications device 250 to perform measurement reporting procedures.

E.g. the method is used for assisting the wireless communications device 250 in determining or selecting one or more radio access network nodes for measurement reporting.

The network node 240 may transmit, to the wireless communications device 250, an indication of one or more radio access network nodes which the wireless communications device 250 may perform mobility between.

The network node 240 may further receive a measurement report. The measurement report may be based on measurements of signals which are related to one or more of the one or more radio access network nodes which the wireless communications device 250 has determined to be used for measurement reporting to the network node 240.

According to some embodiments herein, the object is achieved by the network node 240 configured to perform the method above.

Figure 7:
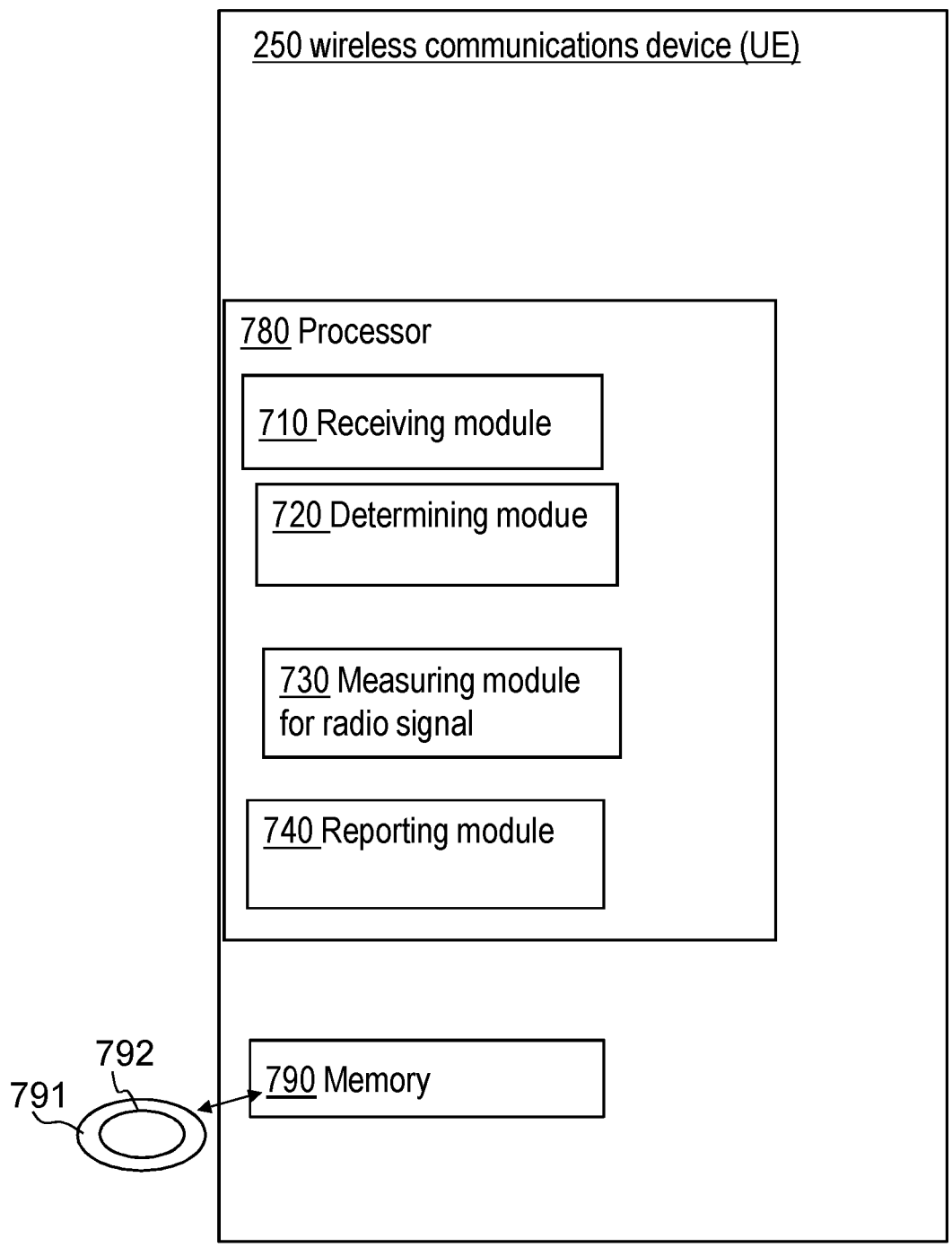
FIG. 7 is a schematic block diagram illustrating embodiments of a wireless communication device.
Figure 8:
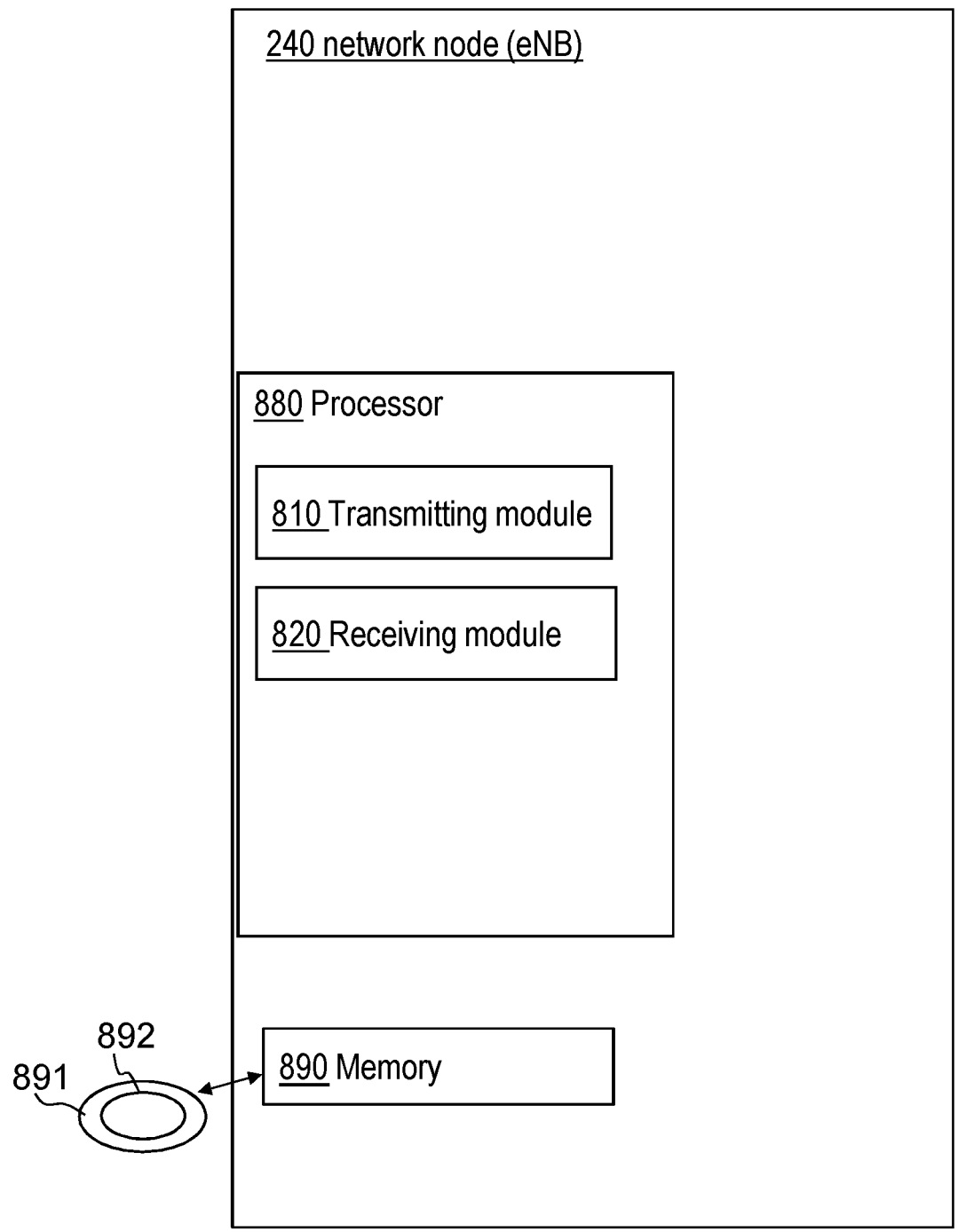
FIG. 8 is a schematic block diagram illustrating embodiments of a network node.

The embodiments herein may be implemented through one or more processors, such as the processor 780 in the wireless communications device 250 depicted in FIG. 7, and the processor 880 in the network node 240 depicted in FIG. 8 together with computer program code for performing the functions and actions of the embodiments herein. The program code mentioned above may also be provided as a computer program product, for instance in the form of a data carrier 791, 891 carrying computer program code 792, 892 for performing the embodiments herein when being loaded into the wireless communications device 250 and the network node 240. One such carrier may be in the form of a CD ROM disc. It is however feasible with other data carriers such as a memory stick. The computer program code may furthermore be provided as pure program code on a server and downloaded to the wireless communications device 250 and network node 240.

Thus, the methods according to the embodiments described herein for the wireless communications device 250 and the network node 240 may be implemented by means of a computer program product, comprising instructions, i.e., software code portions, which, when executed on at least one processor, cause the at least one processor to carry out the actions described herein, as performed by the wireless communications device 250 and the network node 240. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communications device 250 and the network node 240. In some embodiments, the computer-readable storage medium may be a non-transitory computer-readable storage medium.

The wireless communications device 250 and the network node 240 may further each comprise a memory 790, 890, comprising one or more memory units. The memory 790, 890 is arranged to be used to store obtained information such as indications of the mobility set 370, identifiers of APs and WLANs, measurements of signals from radio access nodes, measurement reports or parts thereof and applications etc. to perform the methods herein when being executed in the wireless communications device 250 and the network node 240.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE and WLAN/Wi-Fi has been used in this disclosure to exemplify the embodiments herein, this should not be seen as limiting the scope of the embodiments herein to only the aforementioned network types. Other wireless network types may also benefit from exploiting the ideas covered within this disclosure.

Also note that terminology such as a first radio access node and a second radio access node should be considered to be non-limiting and does in particular not imply a certain hierarchical relation between the two.

What is claimed is:

1. A method performed by a wireless communications device for measurement reporting, the method comprising:
receiving a WLAN mobility set comprising a first set of two or more WLAN identifiers, the first set of two or more WLAN identifies includes a first WLAN identifier and a second WLAN identifier, wherein each WLAN identifier that is included in the first set of WLAN identifiers identifies a WLAN such that the first WLAN identifier identifies a first WLAN and the second WLAN identifier identifies a second WLAN;
receiving a measurement object comprising a second set of one or more WLAN identifiers, wherein each WLAN identifier that is included in the second set of WLAN identifiers identifies a WLAN and at least one of the WLANs identified by a WLAN identifier included in the second set of WLAN identifiers is not identified by any WLAN identifier included in the first set of WLAN identifiers;
determining whether a certain predefined event has occurred, wherein the certain predefined event occurs if and only if: i) all WLANs identified by the WLAN identifiers included in the first set of WLAN identifiers become worse than a first threshold and ii) at least one WLAN that is identified by a WLAN identifier that is included in the second set of WLAN identifiers but that is not identified by any WLAN identifier included in the first set of WLAN identifiers becomes better than a second threshold; and
after determining that the certain predefined event has occurred, triggering a measurement report, wherein
determining whether the certain predefined event has occurred comprises:
obtaining a first measurement result of the first WLAN identified by the first WLAN identifier, which is included in the first set of WLAN identifiers;
determining whether the obtained first measurement result is worse than the first threshold;
obtaining a second measurement result of the second WLAN identified by the second WLAN identifier, which is also included in the first set of WLAN identifiers;
determining whether the obtained second measurement result is worse than the first threshold;
obtaining a third measurement result of a WLAN that is identified by a WLAN identifier that is included in the second set of WLAN identifiers but that is not identified by any WLAN identifier included in the first set of WLAN identifiers; and
determining whether the obtained third measurement result is better than the second threshold.

2. A wireless communications device, comprising:
a storage unit operable to store:
i) a WLAN mobility set comprising a first set of two or more WLAN identifiers, the first set of two or more WLAN identifies includes a first WLAN identifier and a second WLAN identifier, wherein each WLAN identifier that is included in the first set of WLAN identifiers identifies a WLAN such that the first WLAN identifier identifies a first WLAN and the second WLAN identifier identifies a second WLAN and
ii) a measurement object comprising a second set of one or more WLAN identifiers, wherein each WLAN identifier that is included in the second set of WLAN identifiers identifies a WLAN and at least one of the WLANs identified by a WLAN identifier included in the second set of WLAN identifiers is not identified by any WLAN identifier included in the first set of WLAN identifiers; and processing circuitry configured to:
- determine whether a certain predefined event has occurred, wherein the certain predefined event occurs if and only if: i) all WLANs identified by the WLAN identifiers included in the first set of WLAN identifiers become worse than a first threshold and ii) at least one WLAN that is identified by a WLAN identifier that is included in the second set of WLAN identifiers but that is not identified by any WLAN identifier included in the first set of WLAN identifiers becomes better than a second threshold; and
- after determining that the certain predefined event has occurred, trigger a measurement report, wherein the processing circuitry is configured to determine whether the certain predefined event has occurred by performing a process that comprises:

obtaining a first measurement result of the first WLAN identified by the first WLAN identifier, which is included in the first set of WLAN identifiers;

determining whether the obtained first measurement result is worse than the first threshold;

obtaining a second measurement result of the second WLAN identified by the second WLAN identifier, which is also included in the first set of WLAN identifiers;

determining whether the obtained second measurement result is worse than the first threshold;

obtaining a third measurement result of a WLAN that is identified by a WLAN identifier that is included in the second set of WLAN identifiers but that is not identified by any WLAN identifier included in the first set of WLAN identifiers; and determining whether the obtained third measurement result is better than the second threshold.

* * * * *